(12) United States Patent
Aaltonen et al.

(10) Patent No.: US 7,315,532 B2
(45) Date of Patent: Jan. 1, 2008

(54) TIME-DIVIDED TRANSMISSION BETWEEN ADJACENT CELLS

(75) Inventors: Janne Aaltonen, Turku (FI); Juha Salo, Littoinen (FI); Pekka Talmola, Turku (FI)

(73) Assignee: Nokia Corporation, Espoo (FI)

( * ) Notice: Subject to any disclaimer, the term of this patent is extended or adjusted under 35 U.S.C. 154(b) by 525 days.

(21) Appl. No.: 10/865,171

(22) Filed: Jun. 9, 2004

(65) Prior Publication Data

US 2004/0264408 A1 Dec. 30, 2004

(30) Foreign Application Priority Data

Jun. 24, 2003 (GB) ................. 0314742.8

(51) Int. Cl.
*H04J 3/00* (2006.01)
(52) U.S. Cl. .............. 370/336; 370/349; 370/328; 455/422.1
(58) Field of Classification Search .......... 370/336, 370/349, 328, 329; 455/422.1, 446, 447
See application file for complete search history.

(56) References Cited

U.S. PATENT DOCUMENTS

| | | | |
|---|---|---|---|
| 5,227,802 A * | 7/1993 | Pullman et al. | 342/352 |
| 5,408,237 A * | 4/1995 | Patterson et al. | 342/354 |
| 6,069,885 A * | 5/2000 | Fong et al. | 370/336 |
| 6,188,903 B1 | 2/2001 | Gardner et al. | |
| 6,229,812 B1 * | 5/2001 | Parruck et al. | 370/412 |

(Continued)

FOREIGN PATENT DOCUMENTS

| | | | |
|---|---|---|---|
| EP | 0 156 335 A3 | 10/1985 | |
| EP | 0 536 864 A3 | 4/1993 | |

(Continued)

OTHER PUBLICATIONS

Christian Rauch, et al., "Hybrid Mobile Interactive Services combining DVB-T and GPRS", Proceedings of European Personal and Mobile Communications Conference, Feb. 19, 2001, pp. 1-8.

(Continued)

*Primary Examiner*—Matthew Anderson
*Assistant Examiner*—Minh Dao
(74) *Attorney, Agent, or Firm*—Morgan & Finnegan, L.L.P.

(57) ABSTRACT

In a DVB-T network, a single channel is shared between transmitters associated with adjacent cells on a time-division basis. Timing allocation information signals are received at each transmitter, where it is determined therefrom and from a common time reference, such as a GPS receiver or atomic clock, when transmission is and is not allowed. Each of the transmitters then transmits on the channel at different times. The channel may carry Internet Protocol Data Cast Services. The timing allocation may be varied so that transmitters have unequal shares. The allocation may be dynamically controllable depending on demand. Using the invention, a saving of frequency spectrum is obtained without requiring channel rasterisation.

39 Claims, 6 Drawing Sheets

U.S. PATENT DOCUMENTS

| | | | |
|---|---|---|---|
| 6,577,848 B1 * | 6/2003 | Gregg et al. | 455/13.2 |
| 6,657,982 B1 * | 12/2003 | Fong et al. | 370/336 |
| 2003/0100311 A1 * | 5/2003 | Chung et al. | 455/453 |
| 2004/0057398 A1 * | 3/2004 | Black | 370/321 |
| 2004/0064767 A1 * | 4/2004 | Huckaby et al. | 714/710 |
| 2006/0003794 A1 * | 1/2006 | Chung et al. | 455/522 |

FOREIGN PATENT DOCUMENTS

| | | |
|---|---|---|
| EP | 0 959 636 A1 | 11/1999 |
| WO | WO 96/38013 | 11/1996 |
| WO | WO 97/12489 | 4/1997 |
| WO | WO 02/078371 A2 | 10/2002 |

OTHER PUBLICATIONS

Peter Sties, "Radio Broadcast Networks enable Broadband Internet Access for Mobile Users", Eunice '99, Open European Summer School on Access to the Internet in the Next Century, Sep. 1999.

European Search Report and Annex thereto for EP 04 10 2190, Date of Completion of Search—Oct. 4, 2004.

Search Report of priority UK application No. GB 0314742.8, Date of Search—Nov. 17, 2003 (1 page).

* cited by examiner

TIME-DIVIDED TRANSMISSION BETWEEN ADJACENT CELLS

FIELD OF THE INVENTION

This invention relates to a network of at least two transmitters arranged to effect a cellular coverage pattern, and to a method of operating such a network. The invention relates also to a transmitter for operating in such a network, and to a method of operating such a transmitter. The invention has particular application to broadcast, but is not limited thereto.

BACKGROUND OF THE INVENTION

In a cellular type radio network, there are a number of ways of separating the signals transmitted by the transmitter of one cell from those transmitted by the transmitter of an adjacent cell. First and second generation mobile telephone networks used frequency based separation. Here, the network is set up such that transmitters associated with adjacent cells do not transmit on the same frequencies. This works well assuming that there are sufficient frequencies, which leads to its use with narrow frequency bands. A number of frequencies tend to be grouped together, and that group of frequencies is repeated for use with non-adjacent cells across the network. The number of different groups may be between four and fifteen, with seven different groups leading to the honeycomb pattern found in many textbooks.

Third generation mobile telephone systems use a single, wide frequency band, with separation being achieved through the use of different spreading codes.

Within a cell of a Global System for Mobiles (GSM) network, a frequency band is shared between a number of transmitters using time division multiplexing.

All of the above described principles are well known.

It is proposed to provide Internet Protocol Data Cast (IPDC) services as part of digital broadcasting systems such as e.g. the Terrestrial Digital Video Broadcasting (DVB-T) system. The ability to decode data from an IPDC transmission depends on a subscription to that service. To allow reduced power consumption in mobile DVB-T receivers, it has been proposed to transmit IPDC services in bursts utilising the whole of the channel bandwidth, rather than multiplexing them in any other way. This is known as time-slicing. Since DVB-T is a high bandwidth system— each channel may be 6, 7 or 8 MHz wide—the number of available frequencies for cellularisation is quite small. This limits the opportunities for the provision of IPDC services. One way of addressing this is to divide (or rasterise) a DVB-T channel into sub-bands, for example divide an 8 MHz channel into four 2 MHz channels. Cellularisation can then be performed using the sub-bands.

It is an aim of the invention to allow for cellularisation without requiring the division of a channel into sub-bands.

SUMMARY OF THE INVENTION

According to a first aspect of the invention, there is provided a network of at least two transmitters arranged to effect a cellular coverage pattern, the transmitters associated with at least two adjacent cells being arranged to transmit signals at a particular frequency on a time-divided basis.

Using this invention, it becomes possible to transmit signals in plural adjacent cells using a single channel without using code division multiplexing. This can result in a significant saving in the use of the frequency spectrum without affecting the channel rasterisation.

The invention can allow the construction of a broadcast network, such as e.g. a DVB-T network, with a cellular coverage pattern without requiring radio planning to effect a suitable reuse of channel frequencies. Instead, a small number of channels, even one channel, can be shared between all transmitters in the whole of, or part of, a network.

These advantages are particularly significant when the invention is applied to a group of transmitters associated with a given cell and with plural adjacent cells.

The transmitters in a group may in a simple implementation be allocated approximately equal amounts of time on which they are permitted to transmit. This is convenient since it can simplify the network, and can reduce the chances of a transmitter accidentally transmitting at an inappropriate time and thereby interfering with transmissions from another transmitter.

Alternatively, the transmitters in a group could be allocated unequal amounts of time. Thus, a transmitter associated with a cell having a high population density might be awarded a proportion of the available time appropriate to the demand. The allocation may be dynamically allocated with the demand being calculated in any suitable manner, for example using subscriber distribution information obtained from a mobile telephone network or by other means.

Each transmitter may be arranged to control the timing of transmissions on the basis of the time as determined from a common time reference. Such a reference may be an atomic clock or global positioning system (GPS) source, for example. Using a common time reference reduces the possibility of a transmitter transmitting at an inappropriate time, which could result in interference.

According to a second aspect of the invention, there is provided a method of operating a network of at least two transmitters arranged to effect a cellular coverage pattern, the method comprising controlling the transmitters associated with at least two adjacent cells to transmit signals at a given frequency on a time-divided basis.

According to a third aspect of the invention, there is provided a transmitter for operating with other transmitters in a network to effect a cellular coverage pattern, the transmitter comprising a controller arranged to receive received signal timing allocation information, to compare the signal timing allocation information to a source of reference time, and to control transmission at a given frequency to occur only at times determined to be permissible as a result of the comparison.

According to a fourth aspect of the invention, there is also provided a method of operating a transmitter with other transmitters in a network to effect a cellular coverage pattern, the method comprising: comparing received signal timing allocation information to a source of reference time; determining time periods in which transmissions are permissible on the basis of the comparison; and controlling the transmitter to transmit signals at a given frequency only during said time periods.

Embodiments of the invention will now be described, by way of example only, with reference to the accompanying drawings.

DETAILED DESCRIPTION OF THE PREFERRED EMBODIMENTS

Figure 1:
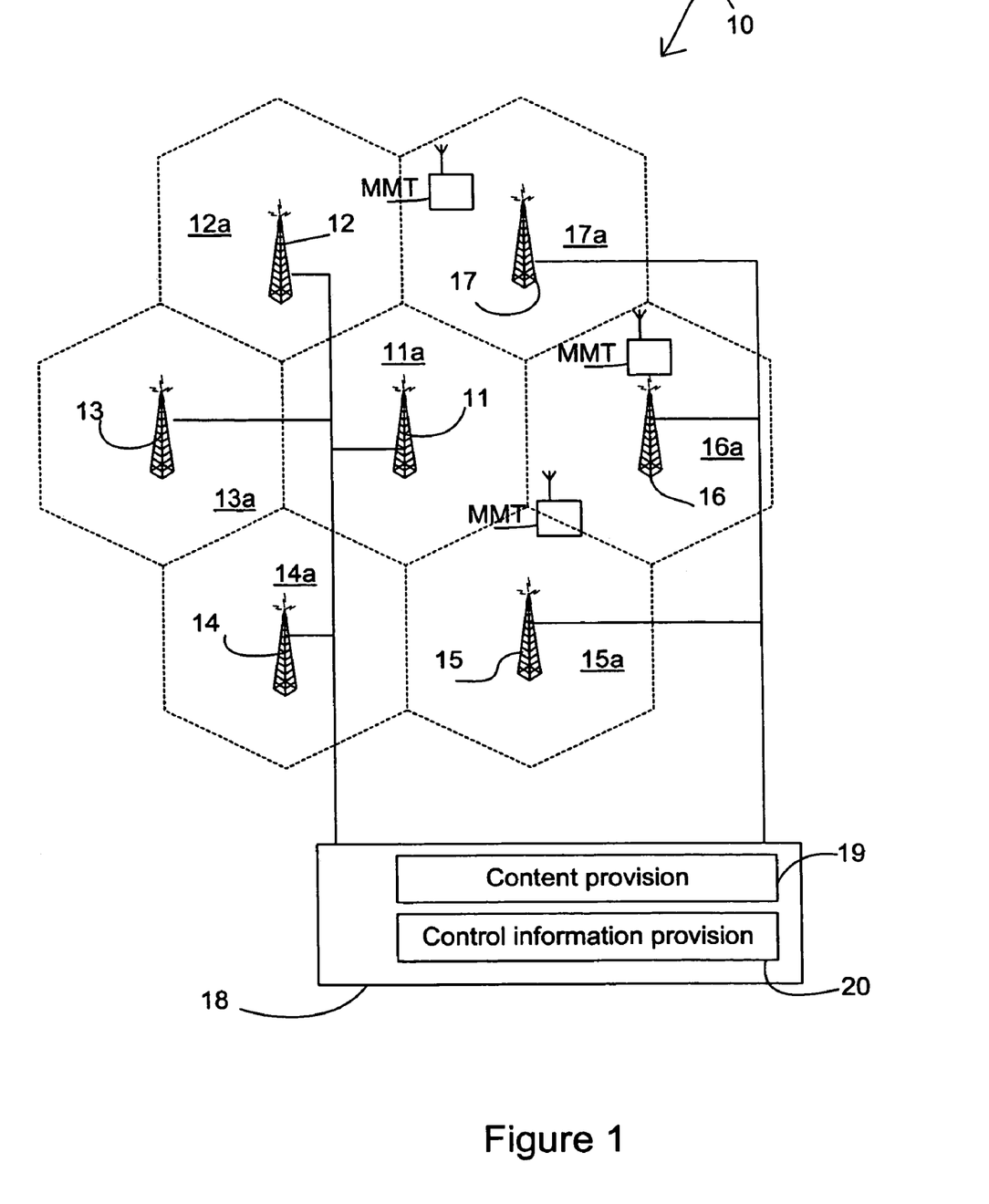
FIG. 1 illustrates a network according to one embodiment of the invention.

Returning firstly to FIG. 1 illustrating schematically one embodiment of the invention, a part of a DVB-T broadcast network 10 is shown comprising first to seventh transmitters 11-17. The second to sixth transmitters 12-17 are arranged around and at appropriate distances from the first transmitter 11 so as to produce a good geographical coverage. The cells associated with the transmitters 11-17 are indicated at 11a-17a, and together form a pattern, which in this simplified example is illustrated schematically as a honeycomb pattern. Roaming between the transmitters 14-17 are some mobile multimedia terminals MMT, which could be like the terminal described in WO01/17255. Each of the transmitters 11 to 17 is connected to a network controller 18, which includes a content provision system 19 and a control information provision system 20. The network controller 18 may be connected to the transmitters in any convenient way, for example via point-to-point microwave links, copper or optical cable, satellite link or any combination thereof. FIG. 1 is purely schematic and it will be appreciated by those skilled in the art what variations to the network topology and system connections are possible.

Figure 2:
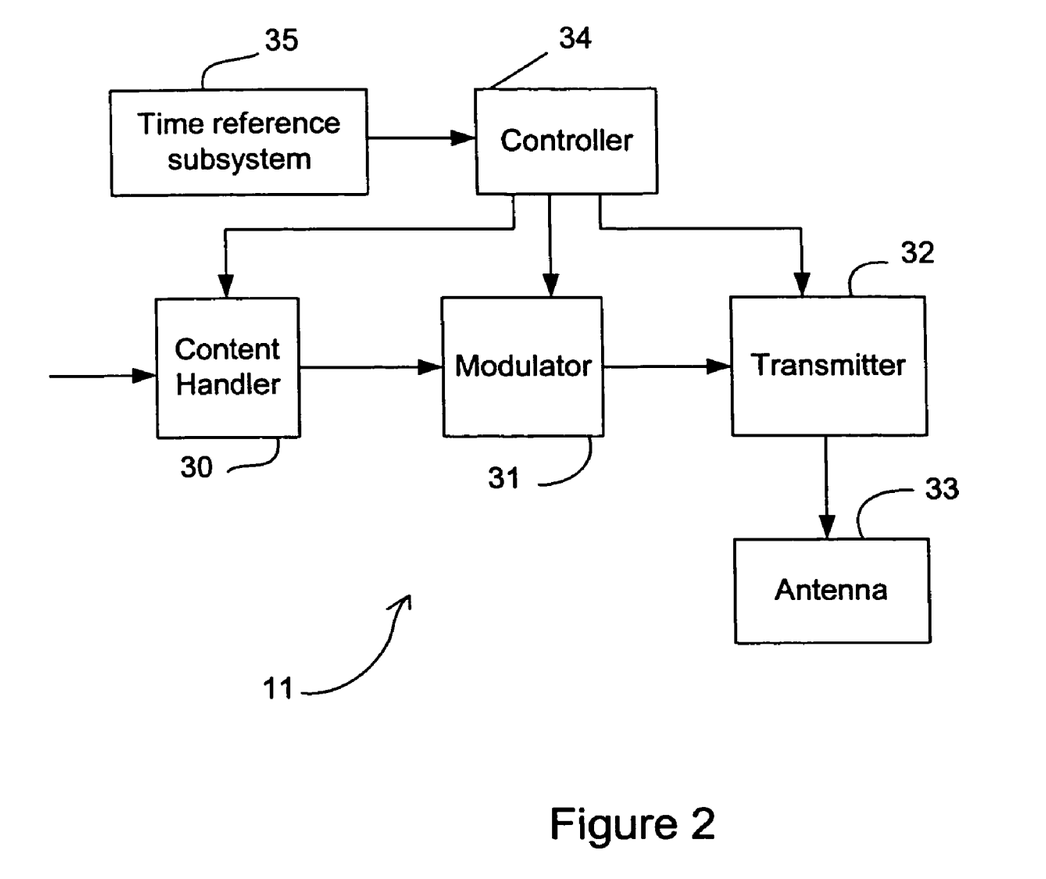
FIG. 2 shows schematically a transmitter constructed and operating according to one embodiment of the invention and forming part of the FIG. 1 network.

Each of the transmitters 11-17 are, in this example substantially similar. One of them is shown in FIG. 2. Referring to FIG. 2, transmitter 11 is shown comprising generally a content handling subsystem or Internet Protocol Encapsulator (IPE) 30, which is arranged to receive content data from the network controller 18. Downstream of the content handling subsystem 30 are a modulator 31, which modulates the data onto an appropriate transport stream, and a transmitter 32, which provides radio frequency (RF) signals including the content data for broadcast by an antenna 33. The transmitter 32, the modulator 31 and the content handling subsystem 30 each operate under control of a controller 34. A time reference subsystem 35, which may include a GPS receiver or an atomic clock (not shown), provides timing reference signals to the controller 34. The time reference subsystem 35 allows the transmitter 11 to be synchronised with the other transmitters 12-17.

The controller 34 is provided with control information sent from the network controller 18. In particular, the controller can cause transmission of the content data to occur on a given channel at times identified by the network controller, and refrain from transmitting at other times. The controller 34 is arranged to control instances of transmission with reference to the control information and to the timing reference time signals provided by the time reference subsystem 35. The controller may arrange for content to be transmitted continuously on one or more other channels. However, transmission is effected on one, time-sliced, channel only when allowed by the control information.

The control information provided by the network controller 18, and more particularly the control information provision system 20 forming part thereof, is such as to allow only one of the seven transmitters 11-17 to transmit on the time-sliced channel at any time. The control information can thus be considered as signal timing allocation information. Let us consider for this example that the time-sliced channel carries IPDC service data, so can be referred to as an IPDC channel. The IPDC channel may be at any of the frequencies available for DVB-T broadcast, and has a bandwidth appropriate to the system. In Europe, DVB-T channels will be 8 MHz in width. Each item of content transmitted on the IPDC channel is intended for one or more subscribers, each of which is provided with suitable means for decoding the content data. Content typically is audio-visual in nature, for example the highlights of a soccer game. Items of content may be required to be broadcast on more than one occasion in respect of a geographical area, to allow for reception and decoding by MMTs which missed a first transmission, due to signal fading for example. Retransmission strategy is outside the scope of this disclosure.

Figure 3A:
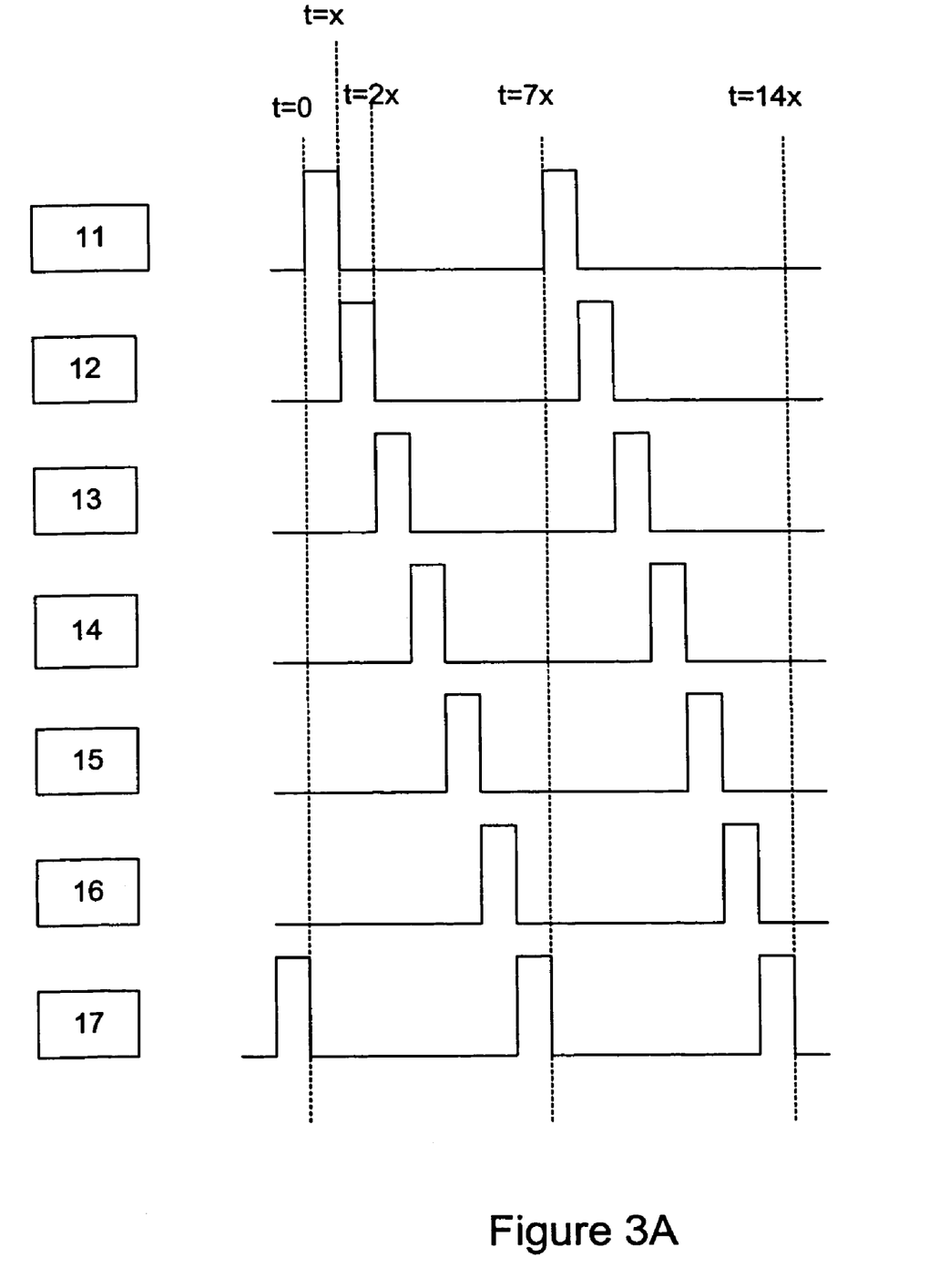
FIG. 3A is a timing diagram by which the embodiment of FIG. 1 network operates.
Figure 3B:
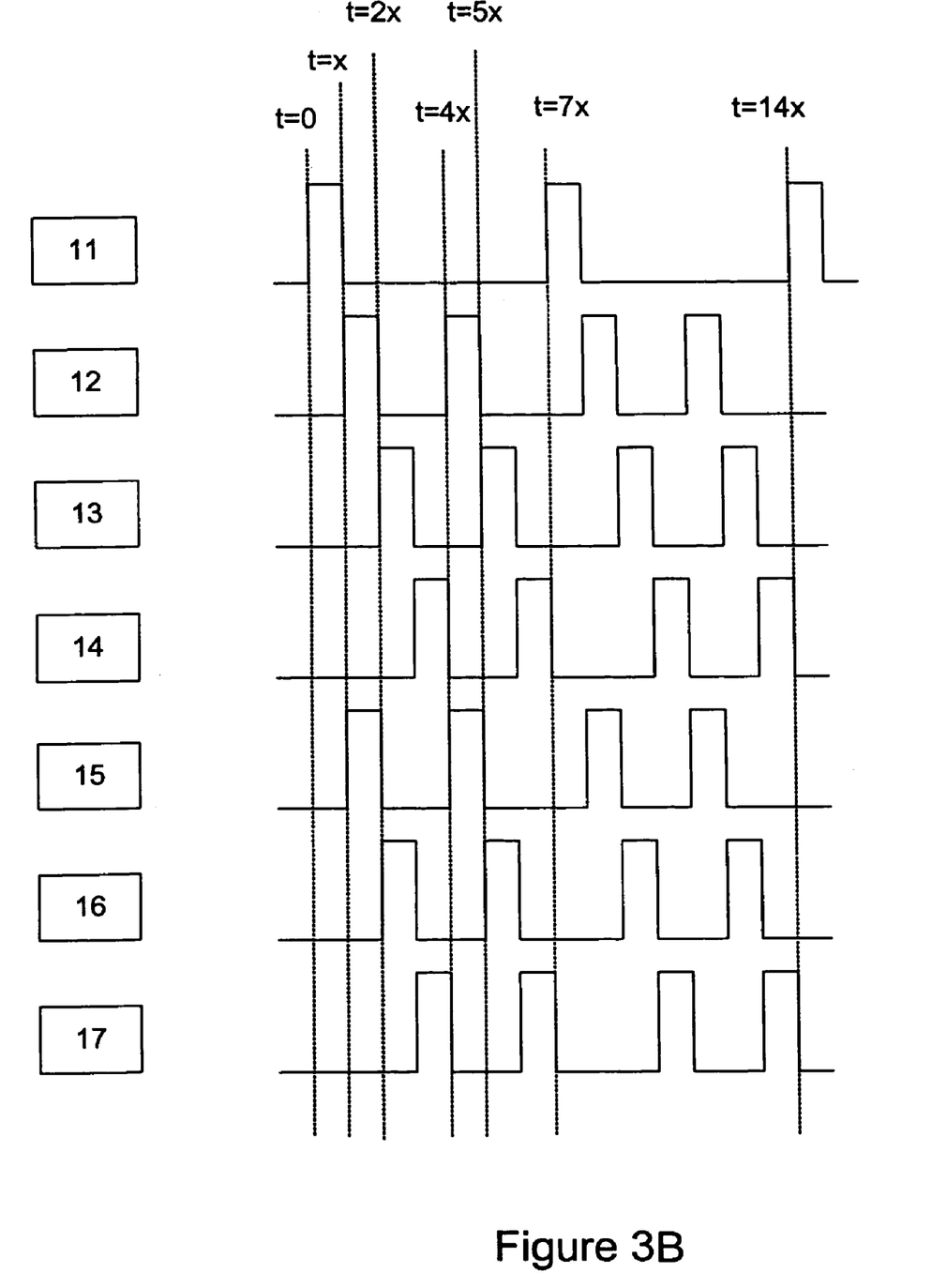
FIG. 3B is a timing diagram for another embodiment of the invention.

The control information provided by the network controller 18 is used by the transmitters 11-17 to effect time-slicing as illustrated in FIG. 3.

Referring to FIG. 3A, which illustrates a simplified example of one embodiment of the invention, the transmissions on the IPDC channel for the transmitters 11-17 are shown. The first transmitter 11 is controlled to broadcast on the IPDC channel from time $t=0$ to time $t=0+x$, when transmission is ceased. The second transmitter 12 is controlled to transmit from $t=x$ to $t=2x$, following which the third transmitter 13 transmits from time $t=2x$ to time $t=3x$, and so on. At time $t=7x$, when the seventh transmitter 17 stops transmitting, the first transmitter 11 again transmits on the IPDC channel, commencing a repeat of the timing sequence. The content transmitted might be different for the different transmitters 11-17, or it might be the same. As a result of the coordinated time-slicing, none of the transmitters 11-17 transmits on the IPDC channel at the same time as another of the transmitters, so they do not interfere with each other in this respect. Accordingly, an MMT decoding the IPDC channel content transmitted by one transmitter will not experience interference of the signal from other transmitters in the group of transmitters 11-17, regardless of its geographical position.

Still in another embodiment of the invention the same time slot may be used for transmission in non-adjacent cells, as illustrated in FIG. 3B, where the transmissions on the IPDC channel for the transmitters 11-17 are shown. In this example the second and fifth transmitters 12 and 15 are in non-adjacent cells 12a and 15a respectively. Similarly, the third and fifth transmitter 13 and 16, and as well as the fourth and seventh transmitters 14 and 17 form non-adjacent transmitter pairs. In this example the first transmitter 11 is controlled to broadcast on the IPDC channel from time $t=0$ to time $t=0+x$, when transmission is ceased. The second transmitter 12 and the fifth transmitter 15 are controlled to transmit from $t=x$ to $t=2x$. As the transmitter 12 and the transmitter 15 are in non-adjacent cells, they both can transmit from $t=x$ to $t=2x$ and from $t=4x$ to $t=5x$. In a similar way, the third and sixth transmitters 13 and 16 transmit from time $t=2x$ to time $t=3x$ and from time $t=5x$ to $t=6x$, and so on. At time $t=7x$, when the fourth and seventh transmitters 14 and 17 stop transmitting, the first transmitter 11 again transmits on the IPDC channel, commencing a repeat of the timing sequence.

The content transmitted might be different for the different transmitters 11-17, or it might be the same. As a result of the co-ordinated time-slicing, none of the transmitters 11-17 transmits on the IPDC channel at the same time as another of the adjacent transmitters, so they do not interfere with each other in this respect. Accordingly, an MMT decoding the IPDC channel content transmitted by one transmitter will not experience interference of the signal from other transmitters in the group of transmitters 11-17, regardless of its geographical position.

To prevent the possibility of a small overlap in the signals transmitted by two transmitters, caused by for example propagation delay or a slight error in the time reference subsystem 35 in one transmitter, the transmissions may be made with a small guard time of, for example, a few milliseconds, between transmissions by successive transmitters. The duration of the guard time will depend on, among other things, the cell size and the accuracy of the time reference subsystems 35.

The signal-timing allocation-information may take any suitable form. For example, it may comprise the absolute times of starting and stopping transmission, with reference to the time reference subsystem 35. The timing may alternatively be given using the duration of the burst and the interval between bursts, or as the time from the end of a burst to the beginning of the next burst. The interval may include in one embodiment of the invention also the guard period. The signal timing may also be included in the transmitted data, e.g. in a header of one or more of the transmitted packets, which can allow it to be used by the receiver for turning the receiver on and off in order to conserve power.

On the other extreme, the information may be mere frame or subframe number, from which starting and stopping times can be derived. Any scheme inbetween these extremes may be used instead.

A single channel can be used in the manner described above in respect of a network having more than seven cells. This embodiment of the invention is illustrated in FIG. 4.

Figure 4:
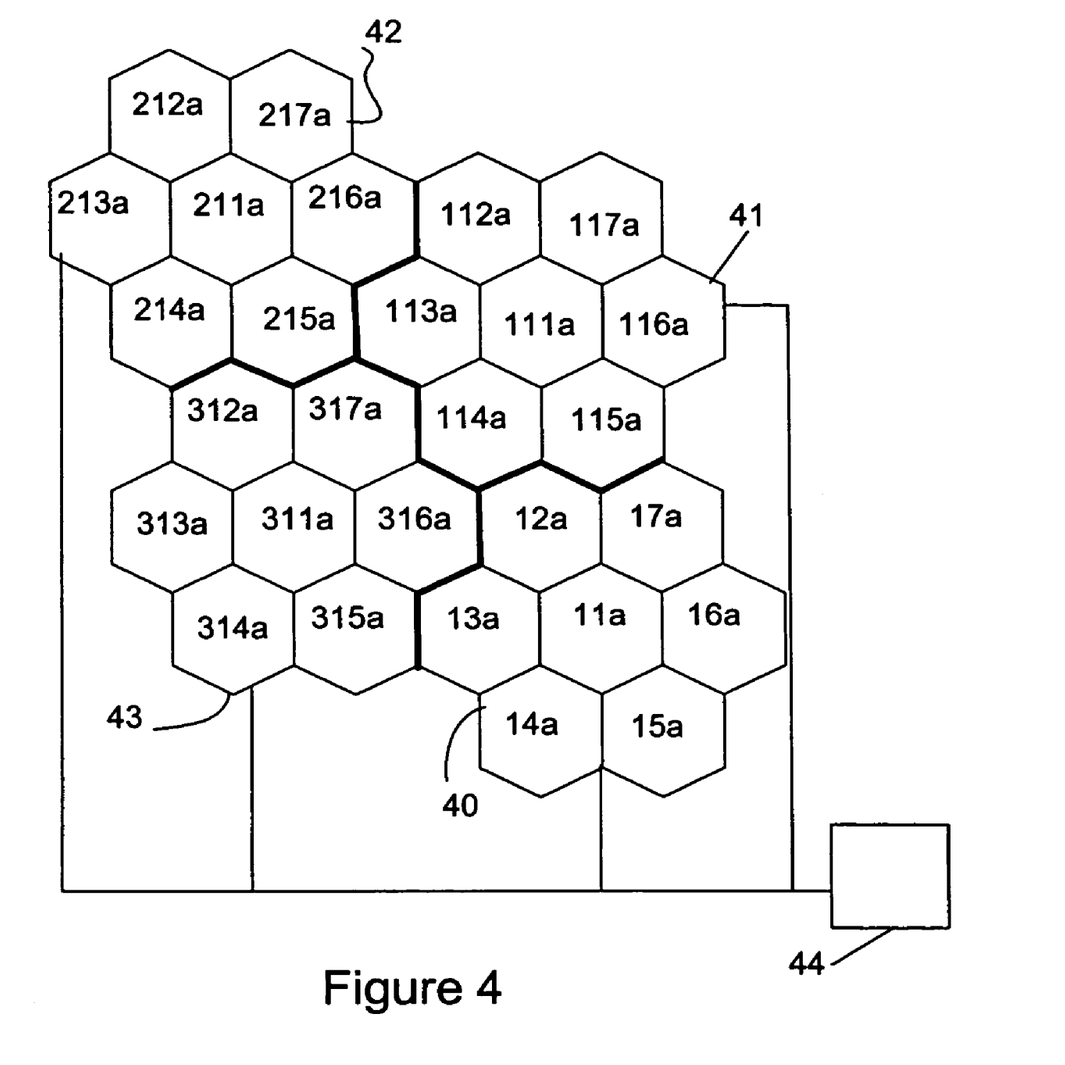
FIG. 4 shows how plural groups of transmitters may be repeated to enlarge a network according to one embodiment of the invention.

Referring to FIG. 4, the transmitters 11-17 are shown together as a group 40. Second, third and fourth groups 41-43 have substantially similar arrangement and timing pattern as the first group 40, and are distributed around the first group in a tessellating manner. The cells in the second group are labelled 111a-117a and the cell in the third and fourth groups are labelled correspondingly. The transmitters of each group 40-43 are provided with signal timing allocation information from a common network controller 44, which allows the corresponding transmitters in different groups to transmit at the same time, thereby avoiding interference with adjacent cells. For example, cells 13a, 113a, 213a and 313a transmit simultaneously, as do cells 14a, 114a, 214a and 314a, and so on.

A downside with the above described scheme is the reduced average bit rate per cell, compared to where a different (frequency) channel is used for each cell. In the example shown, each cell has a capacity of only one seventh of the capacity that the IPDC channel would have, if transmitted continuously. This capacity is reduced further if guard times are used; In some circumstances, the capacity may not be sufficient for one or more cells in a group of adjacent cells.

Figure 5:
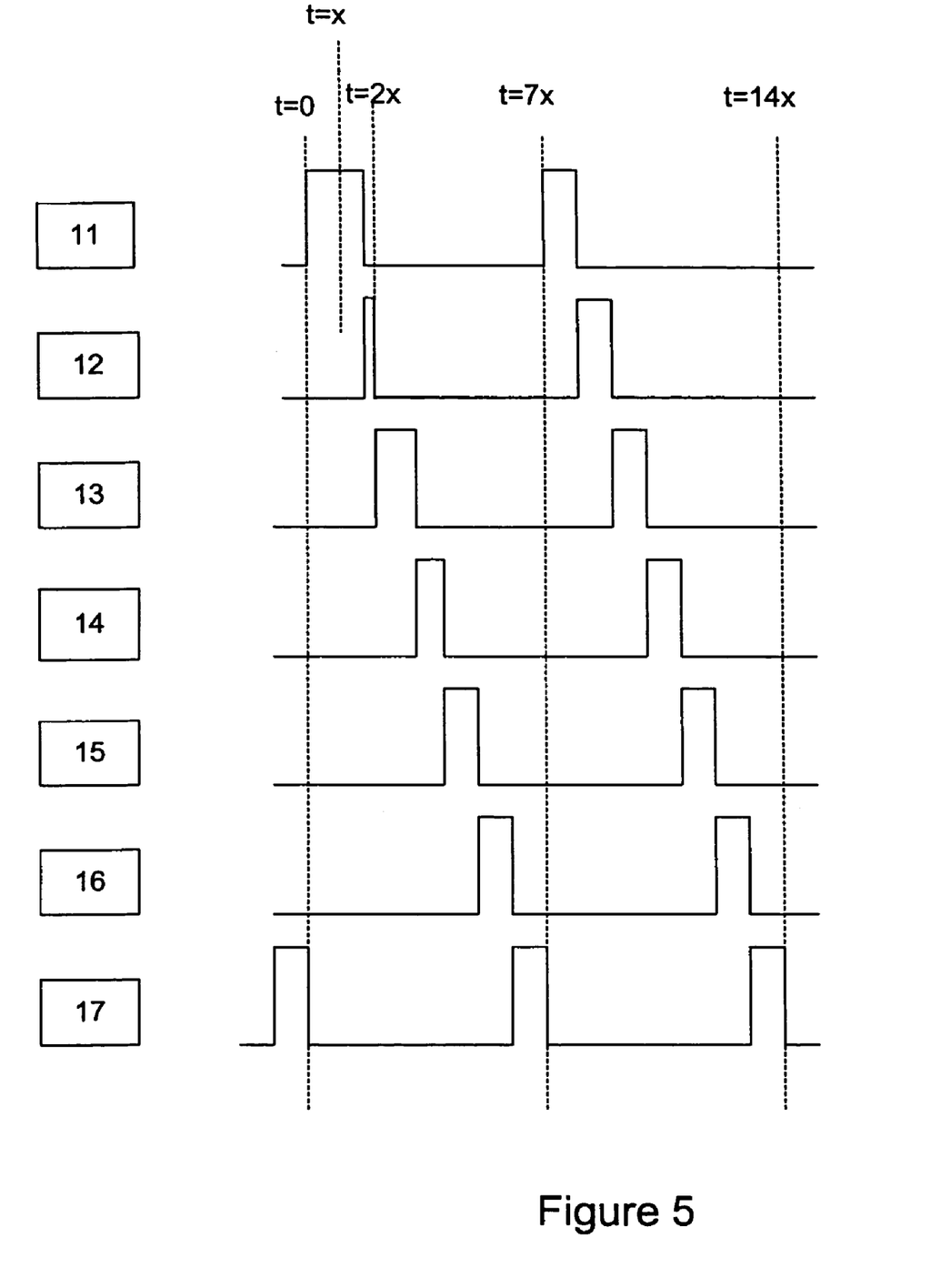
FIG. 5 is a timing diagram showing how signal timing allocations can vary between transmitters associated with adjacent cells in one embodiment of the invention.

In a further embodiment, the allocation of time may vary between transmitters in a group, as shown in FIG. 5. Referring to FIG. 5, timing allocation is shown for the transmitters 11-17. It can be seen that the first and third transmitters 11, 13 are provided with proportionately more of the time available, at the expense of the second and fourth transmitters 12, 14.

Preferably, the signals transmitted by a transmitter 11-17 includes data indicating the timing allocation information associated with its cell. The information may or may not be in the same format as that received from the network controller 18. On decoding the information, an MMT can determine when to activate its receiver to receive the transmitted content, and when it can switch off its receiver to save power.

The adjustment of the time allocation may require co-ordination by the network controller 44 of certain transmitters in other groups 41-43 to prevent interference between groups. This may be effected by controlling the time allocations of corresponding transmitters in the other groups 41-43 to take the same allocation as the first group 40. Alternatively, any other suitable scheme could be used.

Preferably, the timing allocation is adjustable dynamically, to take account of particularly high demand in one or more cells for example.

Although the cells described above have been illustrated for simplicity to have a hexagonal shape, they may instead take any other suitable shape depending e.g. on the geographical situation. For example, a cell resembling a hexagon may be sectored into three cells, each resembling a kite shape. More or less than seven cells may be used in the time-slice reuse pattern, especially if cells resembling the kite shape are present. It will also be appreciated that cell boundaries may not be clear, and that there may be areas in which signals from two or three transmitters are receivable and decodable.

Although the above examples relate to DVB-T broadcast networks, the invention is applicable to other kinds of broadcasting network, such as a digital broadband broadcast network defined by the Advanced Television Systems Committee (ATSC) and the Integrated Services Digital Broadcasting (ISDB) network. The invention may also be used in non-broadcast networks, for example on downlink communications in mobile telephone or satellite telephone systems.

Also, although in the above only one channel, an IPDC channel, is time-sliced between the transmitters 11-17, the concept may be applied to the division of two or more channels between transmitters associated with adjacent cells.

It is also not necessary that the exact same channel is time-sliced. For example, the first transmitter might transmit on a channel which is twice the width of channels used by the other transmitters 12-17 but overlaps therewith. The important factor is in the avoidance of transmitting signals at the same frequency at the same time.

Although in the above embodiments transmitters associated with adjacent cells are controlled not to transmit at the same frequency at the same time, it will be appreciated that one such transmitter may be allowed to transmit at a low power. If the power is sufficiently low, then it would not interfere significantly with transmissions in an adjacent cell so would not be problematic.

What is claimed is:

1. A network, the network comprising:
at least two broadcast transmitters, said at least two broadcast transmitters being arranged to effect a cellular coverage pattern, said cellular coverage pattern comprising at least two cells, each of said at least two broadcast transmitters being associated with each of said at least two cells, said at least two broadcast transmitters comprising a first transmitter associated with a first cell and a second broadcast transmitter associated with a second cell, said second cell being adjacent to said first cell,
wherein said first and second broadcast transmitters are arranged to broadcast content data signals at a particular frequency on a time-divided basis, said content data being broadcast in bursts, each of said bursts comprising at least one packet, and wherein said first transmitter is arranged to include in a header of one or more of said at least one packet signal timing allocation information, said signal timing allocation information identifying when said bursts are broadcast from said first broadcast transmitter.

2. A network as claimed in claim 1, in which each of a group of broadcast transmitters, the group comprising broadcast transmitters associated with a given cells and with plural adjacent cells, is arranged such that no two broadcast transmitters in the group broadcast at the same frequency at the same time at a power level sufficient to cause significant interference in an adjacent cell.

3. A network as claimed in claim 2, in which the broadcast transmitters in a group are allocated approximately equal amounts of time on which they are permitted to transmit.

4. A network as claimed in claim 2, in which the broadcast transmitters in a group are allocated unequal amounts of time in which they are permitted to broadcast.

5. A network as claimed in claim 2, in which the network comprises plural groups arranged in a repeating pattern.

6. A network as claimed in claim 1, in which each broadcast transmitter is arranged to control instances of broadcast on the basis of the time as determined from a common time reference.

7. A network as claimed in claim 1, in which the signals relate to audio-visual content.

8. A network as claimed in claim 1, in which the network is a digital video broadcasting network.

9. A network as claimed in claim 8, in which at least some of the signals relate to Internet Protocol Data Cast services.

10. A network as claimed in claim 1, in which the signal timing allocation information comprises absolute times of starting and stopping broadcast.

11. A network as claimed in claim 1, in which the signal timing allocation information comprises a duration of the burst and an interval between bursts.

12. A network as claimed in claim 11, in which the interval includes a guard period.

13. A network as claimed in claim 1, in which the signal timing allocation information comprises an interval between an end of a burst and a beginning of the next burst.

14. A network as claimed in claim 1, in which the signal timing allocation information comprises a frame or sub-frame number, from which starting and stopping times can be derived.

15. A method of operating a network, the method comprising:

providing at least two broadcast transmitters, said at least two broadcast transmitters being arranged to effect a cellular coverage pattern, said cellular coverage pattern comprising at least two cells, each of said at least two broadcast transmitters being associated with each of said at least two cells, said at least two broadcast transmitters comprising a first transmitter associated with a first cell and a second broadcast transmitter associated with a second cell, said second cell being adjacent to said first cell, controlling said first and second broadcast transmitters to broadcast content data signals at a given frequency on a time-divided basis, said content data being broadcast in bursts, each of said bursts comprising at least one packet; and including in a header of one or more of said at least one packet of signal timing allocation information, said signal timing allocation information identifying when said bursts are broadcast from said first broadcast transmitter.

16. A method as claimed in claim 15, the method comprising controlling each of a group of broadcast transmitters, the group comprising broadcast transmitters associated with a given cell and with plural adjacent cells, such that no two broadcast transmitters in the group broadcast at the same frequency at the same time at a power level sufficient to cause significant interference in an adjacent cell.

17. A method as claimed in claim 16, comprising allocating broadcast transmitters in a group approximately equal amounts of time on which they are permitted to broadcast.

18. A method as claimed in claim 16, comprising allocating the broadcast transmitters in a group unequal amounts of time on which they are permitted to broadcast.

19. A method as claimed in claim 15, comprising controlling each broadcast transmitter to effect instances of broadcast on the basis of the time as determined from a common time reference.

20. A method as claimed in claim 15, in which the signals relate to audio-visual content.

21. A method as claimed in claim 15, in which the network is a digital video broadcasting network.

22. A method as claimed in claim 21, in which at least some of the signals relate to Internet Protocol Data Cast services.

23. A method as claimed in claim 15, in which the signal timing allocation information comprises absolute times of starting and stopping broadcast.

24. A method as claimed in claim 15, in which the signal timing allocation information comprises a duration of the burst and an interval between bursts.

25. A method as claimed in claim 24, in which the interval includes a guard period.

26. A method as claimed in claim 15, in which the signal timing allocation information comprises an interval between an end of a burst and a beginning of the next burst.

27. A method as claimed in claim 15, in which the signal timing allocation information comprises a frame or sub-frame number, from which starting and stopping times can be derived.

28. A broadcast transmitter for operating with at least one other broadcast transmitter in a network to effect a cellular coverage pattern, said broadcast transmitter comprising a controller, said controller being arranged to:

receive signal timing allocation information;

control broadcast of content data signals, said content data signals being broadcast in bursts, each of said bursts comprising at least one packet;

control broadcast of said bursts at a given frequency and only at times determined to be permissible by comparison of said received signal timing allocation information to a source of reference time; and include in a header of one or more packets of the broadcast content data signal timing allocation information, said signal timing allocation information identifying when said bursts are broadcast from said broadcast transmitter.

29. A broadcast transmitter as claimed in claim 28, in which the signal timing allocation information comprises absolute times of starting and stopping broadcast.

30. A broadcast transmitter as claimed in claim 28, in which the signal timing allocation information comprises a duration of the burst and an interval between bursts.

31. A broadcast transmitter as claimed in claim 30, in which the interval includes a guard period.

32. A broadcast transmitter as claimed in claim 28, in which the signal timing allocation information comprises an interval between an end of a burst and a beginning of the next burst.

33. A broadcast transmitter as claimed in claim 28, in which the signal timing allocation information comprises a frame or subframe number, from which starting and stopping times can be derived.

34. A method of operating a broadcast transmitter with other broadcast transmitters in a network to effect a cellular coverage pattern, the method comprising:
  receiving signal timing allocation information;
  comparing said received signal timing allocation information to a source of reference time;
  determining time periods in which broadcasts content data signals are permissible on the basis of said comparing step;
  controlling said broadcast transmitter to broadcast content data signals, said content data signals being broadcast in bursts, said burst being broadcast at a given frequency only during said time periods; and
  including in a header of one or more packets of the broadcast content data signal timing allocation information, said signal timing allocation information identifying when said bursts are broadcast from said broadcast transmitter.

35. A method as claimed in claim 34, in which the signal timing allocation information comprises absolute times of starting and stopping broadcast.

36. A method as claimed in claim 34, in which the signal timing allocation information comprises a duration of the burst and an interval between bursts.

37. A method as claimed in claim 36, in which the interval includes a guard period.

38. A method as claimed in claim 34, in which the signal timing allocation information comprises an interval between an end of a burst and a beginning of the next burst.

39. A method as claimed in claim 34, in which the signal timing allocation information comprises a frame or subframe number, from which starting and stopping times can be derived.

* * * * *